US010061790B2

(12) United States Patent
Gerrard et al.

(10) Patent No.: US 10,061,790 B2
(45) Date of Patent: Aug. 28, 2018

(54) RECONCILER FOR A DISTRIBUTED STORAGE SYSTEM

(71) Applicant: SwiftStack, Inc., San Francisco, CA (US)

(72) Inventors: Clay Gerrard, San Francisco, CA (US); Paul Luse, San Francisco, CA (US); Samuel N. Merritt, San Francisco, CA (US); John Dickinson, San Francisco, CA (US)

(73) Assignee: SwiftStack, Inc., San Francisco, CA (US)

( * ) Notice: Subject to any disclaimer, the term of this patent is extended or adjusted under 35 U.S.C. 154(b) by 515 days.

(21) Appl. No.: 14/793,568

(22) Filed: Jul. 7, 2015

(65) Prior Publication Data

US 2017/0011078 A1    Jan. 12, 2017

(51) Int. Cl.
*G06F 17/30* (2006.01)

(52) U.S. Cl.
CPC .. *G06F 17/30312* (2013.01); *G06F 17/30339* (2013.01)

(58) Field of Classification Search
CPC ......... G06F 17/30312; G06F 17/30339; G06F 17/30194; G06F 17/30215; G06F 17/30227; G06F 17/30371; G06F 17/30575; G06F 17/30581
USPC ........................................................ 707/736
See application file for complete search history.

(56) References Cited

U.S. PATENT DOCUMENTS

| 7,801,850 B2* | 9/2010 | Moore ............. G06F 17/30233 707/610 |
| 9,626,253 B1* | 4/2017 | Zhang ................. G06F 11/1458 |
| 2010/0154025 A1* | 6/2010 | Esteve Balducci ..... H04L 63/20 726/1 |
| 2010/0217853 A1* | 8/2010 | Alexander ............. H04L 63/20 709/223 |
| 2012/0101991 A1* | 4/2012 | Srivas ............... G06F 17/30194 707/623 |
| 2013/0097275 A1* | 4/2013 | Wofford, IV ......... G06F 3/0605 709/213 |
| 2016/0085841 A1* | 3/2016 | Dorfman ........... G06F 17/30598 707/738 |

* cited by examiner

*Primary Examiner* — Evan Aspinwall
(74) *Attorney, Agent, or Firm* — Perkins Coie LLP

(57) ABSTRACT

A technique is applied to eventually converge on a single data storage strategy for any set of object data which had an inconsistent data storage strategy applied during storage while there was a network partition. This state could occur in instances of a highly available distributed object storage system which can store objects according to multiple data storage strategies. Upon the healing of a network partition, the technique discovers if multiple data storage strategies were applied to the object data stored during a network partition, deterministically identifies which data storage strategy represents the correct strategy, for example based on the log of state transitions requested by the client according to the API contract, and ensures that this strategy is consistently applied to all object data in the collection.

7 Claims, 7 Drawing Sheets

RECONCILER FOR A DISTRIBUTED STORAGE SYSTEM

FIELD

The invention relates to storage systems. More particularly, the invention relates to storage systems based on hashing rings.

BACKGROUND

OpenStack

OpenStack is a free and open-source cloud computing software platform. Users primarily deploy it as an infrastructure as a service (IaaS) solution. The technology consists of a series of interrelated projects that control pools of processing, storage, and networking resources throughout a data center which users manage through a Web-based dashboard, command-line tools, or a RESTful API.

Representational State Transfer (REST) is a software architecture style consisting of guidelines and best practices for creating scalable Web services. REST is a coordinated set of constraints applied to the design of components in a distributed hypermedia system that can lead to a more performant and maintainable architecture.

OpenStack Object Storage (Swift) is a scalable redundant storage system. Objects and files are written to multiple disk drives spread throughout servers in the data center, with the OpenStack Swift software responsible for ensuring data replication and integrity across the cluster. Storage clusters scale horizontally simply by adding new servers. Should a server or hard drive fail, OpenStack Swift replicates its content from other active nodes to new locations in the cluster. Because OpenStack Swift uses software logic to ensure data replication and distribution across different devices, inexpensive commodity hard drives and servers can be used.

Object Storage Cluster

A collection of servers, called nodes, running all the services and processes needed to behave as a distributed object storage system can be referred to as a cluster. These object storage processes can include proxy, account, container, and object server processes. Proxy server processes handle external communication with clients using a RESTful HTTP API. In this architecture, the account, container, and object server processes each handle their own kind of data. See FIG. 1.

A cluster of nodes can be grouped by region, which is often defined by geography, and then zone. See FIG. 2.

Data Access and Placement

Once a cluster is running processes and correctly grouped it is ready to store objects. In the case of Swift, objects are stored by clients (people or programs) by their storage location.

In Swift, a client sends a request to the storage cluster's API endpoint (http://example.com) and appends the storage location of the object (/account/container/object). Swift provides a user with an account having containers into which objects are put. Accounts are the root storage locations for data in a cluster (/account) and the account server process maintains account information in a database in the cluster. Containers are user-defined segments of the account that provide a way to group objects together (/account/container) and the container server process maintains container information in a database in the cluster. Each object has a unique storage location based on its name and the account and container in which it is stored (/account/container/object).

The object server process is the storage service that can store, retrieve, and maintain objects on the drives of the nodes.

While users and applications find an object by its storage location (/account/container/object), the object is actually stored in more than one place in the cluster. The default behavior of the object storage system is to store whole copies of the data on multiple drives for storage. The industry standard is to store three copies of the data, each as far from each other as possible in the cluster so that one hardware failure does not cause data loss or unavailability of data.

Data placement is determined with a variation of consistent hashing ring methodology. Consistent hashing is based on mapping each object to a point on the edge of a circle or, equivalently, mapping each object to a real angle. The system maps each available machine or other storage bucket to many pseudo-randomly distributed points on the edge of the same circle.

To find where an object should be placed, the system finds the location of that object's key on the edge of the circle; then walks around the circle until it falls into the first bucket it encounters or, equivalently, the first available bucket with a higher angle. The result is that each bucket contains all of the resources located between its point and the previous bucket point.

If a bucket becomes unavailable, for example because the computer it resides on is not reachable, then the angles it maps to are removed. Requests for resources that would have been mapped to each of those points now map to the next highest point. Because each bucket is associated with many pseudo-randomly distributed points, the resources that were held by that bucket now map to many different buckets. The items that mapped to the lost bucket must be redistributed among the remaining ones, but values mapping to other buckets still do so and do not need to be moved.

A similar process occurs when a bucket is added. By adding a bucket point, any resources between that and the next smaller angle map to the new bucket. These resources are no longer associated with the previous bucket, and any value previously stored there is not found by the selection method described above.

The portion of the keys associated with each bucket can be altered by altering the number of angles to which that bucket maps.

In OpenStack Swift, the storage location of an account (/account), container (/account/container) or object (/account/container/object) is hashed and the result is used in a data structure, called a ring, to look up the physical locations where data is placed in the cluster. Each cluster has a set of rings, e.g. one account ring, one container ring, and one or more storage policy object rings, which are copied to each node. During the creation of a ring, an algorithm is used to determine how to keep the copies as far apart as possible, while accounting for several factors including storage policies.

Storage policies are a way of defining space within a cluster that can be customized for various factors to meet the specific data storage needs of a user, e.g. hardware tiering, increased data durability, and geographic constraints. These policies are defined in a configuration file and, for each defined policy, a corresponding storage policy object ring is created. A policy can then be applied to a container during its creation and any object stored in the container has the storage policy applied to it.

Because there can be multiple object storage policies, when the system is handling an object, it first checks the object's container to determine which policy is used. The system can then use the correct storage policy object ring to find the locations of the object in the cluster.

For example, a storage policy, e.g. policy-2, is created to store four copies of data instead of the standard three. A new container has this policy applied to it. A user puts an object in that container. The system determines that the container policy is policy-2 and then goes to the corresponding storage policy object ring, e.g. the object-2.ring, and uses the hash of the object storage location to determine the four locations where the object is stored. See FIG. 3.

Characteristics of Object Storage

Frequently when talking about storage systems the idea from Brewster's CAP theorem comes up that a distributed system can only have two out of three characteristics:

Consistency—Updates are applied to all relevant nodes at the same logical time;

Availability—Every non-failing node executes queries returns a response; and

Partition tolerance—The system can still operate and provide consistency and availability if packets are lost or arrive late, or if part of the system is unreachable.

In reality, nearly all systems start by choosing partition tolerance, i.e. having a system that grinds to a halt if the network is not perfect cannot survive in real world conditions. Accordingly, most storage systems trade off consistency against availability. In this embodiment, consistency is traded off in favor of availability. This is generally referred to as having an eventually consistent storage system.

Eventual consistency makes sense for a distributed object system because there is a fairly good chance that one or more nodes may be unreachable to the rest of the system for some period of time. In such a case, the nodes on either side of the connection failure could very well be able to continue to operate, including storing data, creating containers, etc.

Once the connection is reestablished, there is a possibility of conflicts, including a situation where two containers with the same name but different storage policies have been created. In such a split-brain case, a solution must be created to help the system heal. It would be advantageous to maintain eventual consistency and resolve conflicts between multiple storage policies that are erroneously associated with a hierarchical construct, such as a container or bucket.

SUMMARY

Embodiments of the invention provide a technique that eventually converges on a single data storage strategy for any set of object data which had an inconsistent data storage strategy applied during storage while there was a network partition. This state could occur in instances of a highly available distributed object storage system which can store objects according to multiple data storage strategies.

Embodiments of the invention, upon the healing of a network partition, discover if multiple data storage strategies were applied to the object data stored during a network partition, deterministically identify which data storage strategy represents the correct strategy, for example based on the log of state transitions requested by the client according to the API contract, which comprises a log of container and object create API calls, and ensure that this strategy is consistently applied to all object data in the collection.

DRAWINGS

DESCRIPTION

Embodiments of the invention provide a technique that eventually converges on a single data storage strategy for any set of object data which had an inconsistent data storage strategy applied during storage while there was a network partition. This state could occur, for example, in instances of a highly available distributed object storage system which can store objects according to multiple data storage strategies.

Embodiments of the invention, upon the healing of a network partition, discover if multiple data storage strategies were applied to the object data stored during a network partition, deterministically identify which data storage strategy represents the correct strategy, for example based on the log of state transitions requested by the client according to the API contract, and ensure that this strategy is consistently applied to all object data in the collection.

Discussion

Given a highly available distributed object storage system which can store objects according to multiple data storage strategies, (each referred to as a "storage policy"), there is the possibility of an inconsistent application of the storage policies during a network partition. The system would have to sacrifice availability during a network partition to ensure consistency, something that a system designed to be highly available would not do.

Storage policies are applied to containers and any object placed in the container that has that policy applied to it. As such, there are certain expectations regarding policies and containers:

A storage policy is set for a container when it is created;

A storage policy cannot be changed on a container;

Only an empty container may be deleted; and

Once a container is deleted, it is permissible to create a new container with the same name.

Figure 1:
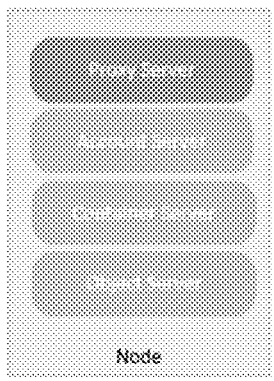
FIG. 1 is a block schematic diagram showing a proxy server, account, container, and object server processes.
Figure 2:
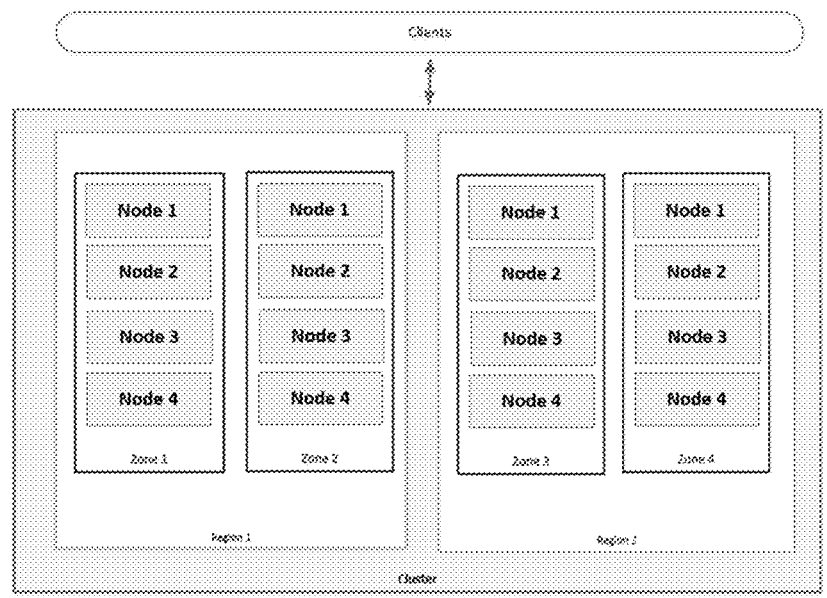
FIG. 2 is a block schematic diagram showing a cluster of nodes grouped by region.
Figure 3:
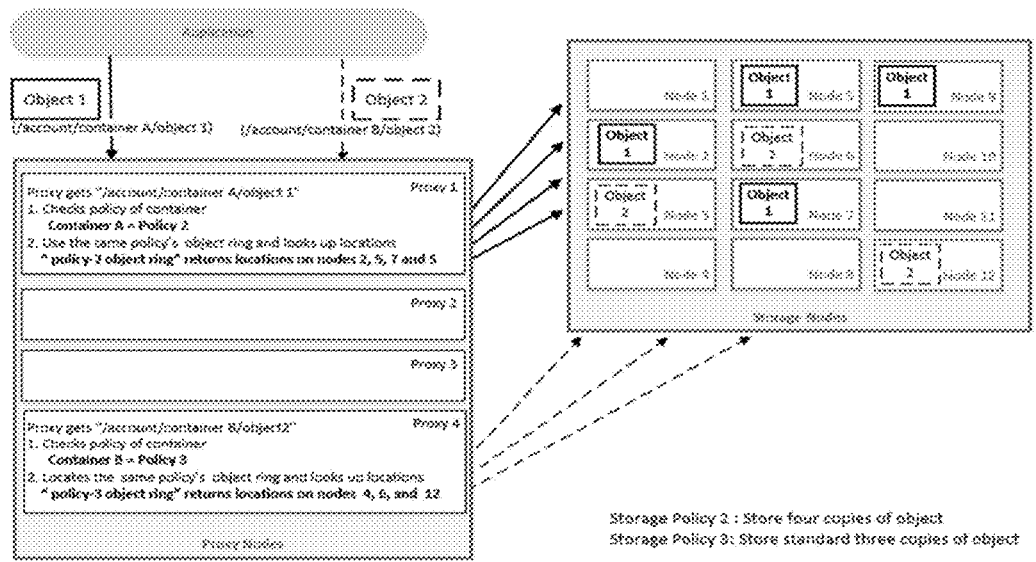
FIG. 3 is a block schematic diagram showing the hash of an object storage location to determine the locations where the object is stored.
Figure 4A:
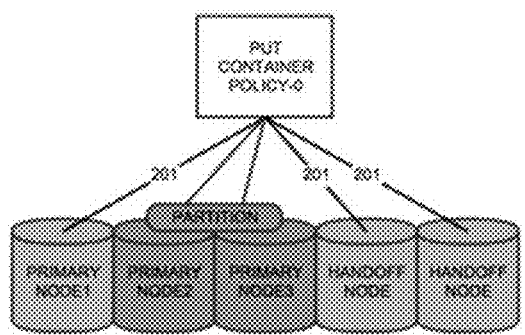
FIGS. 4A and 4B are block schematic diagrams that show a conflict in a distributed storage system.
Figure 4B:
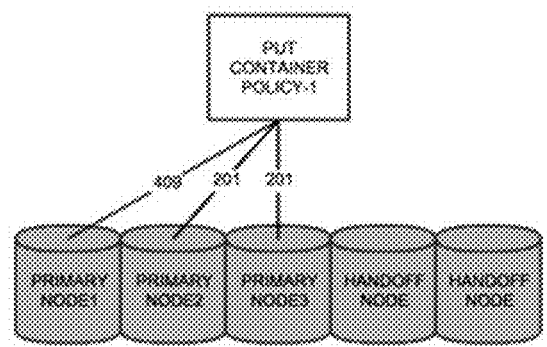

A simple example of a trivial distributed implementation which would encounter such a split-brain is described in FIGS. 4A and 4B.

In FIG. 4A, a network partition makes two of the primary nodes unreachable. While in this state, a client creates a container with policy-0. This container is supposed to store the copies on the three primary nodes. However, to achieve availability when a subset of the nodes is not available, the data is copied to handoff nodes and is eventually moved to the primary nodes at some point after the network partition is healed and the primary nodes become available again.

In FIG. 4B, the network partition has been restored and a client has created a container with the same name but a different policy (policy-1). Because the system is eventually consistent this new container request arrives to the two newly restored primary nodes before the system had a chance to update them about the container with policy-0.

As a result the primary node (NODE1) that already has the container with policy-0 returns an error indicating a conflict, while the two nodes (NODE2 and NODE3) that were previously unavailable proceed to create the container with policy-1. At this point any subsequent requests result in an inconsistent response.

There are many implementation specific strategies which are applied in highly available distributed systems, such as Swift, to improve the probability of a consistent response during and after a network partition without sacrificing availability, Most of these strategies lean on the probability that, following a network partition to some primaries, it is unlikely that a subsequent request immediately following a healed network partition would encounter a different network partition to some or all of the nodes which serviced the previous request. However, any non-zero probability creates a non-zero existence proof at scale.

Replicator Discovers and Logs Misplaced Objects

Embodiments of the invention resolve these spilt brain inconsistencies first by applying container replicator processes to discover them and then by adding them to a misplaced objects queue. Container replicator processes are run on nodes in the cluster to do maintenance. When a storage policy discrepancy for an object is discovered, the container replication process logs the object's information in a separate queue (see, for example, US patent application s/n 2014/082,301).

In a distributed system, each write for an object is a separate transaction. Each transaction is recorded in the container database by the container replicator. In addition to ensuring that the container database entries are populated, the container replicator also identifies objects with conflicting storage policies. Once a conflicting object is identified, the replicator copies that object's row from the container database to a local misplaced objects container. If a misplaced objects container does not exist then the container replicator creates one.

Embodiments of the invention use a log format to record the state transitions which result from a series of requests. Each container replica maintains a set of three vectors indicating when it last recorded a PUT or DELETE and when these resulted in a change of its status (created or deleted). These log items are compared between two containers to determine a representation of the transaction history which resulted in this state. A storage policy is deterministically selected based on the described rules (see below.

Reconciler Processes the Misplaced Object Container

Running periodically (as configured), the container reconciler locates and processes any misplaced objects containers. The container reconciler examines the object rows in each misplaced objects container in descending order and then determines the correct policy. It makes calls to the disputed containers and uses information about the timestamps to determine which container policy is the correct one.

In embodiments of the invention, the following behavior is exhibited:
- When a container is created it updates PUT and STATUS with the time of that action;
- When a container is deleted it updates DELETE with the time of that action;
- If the time of the DELETE action is not nil and it is greater than the time of the PUT action the container is considered in a DELETED state, otherwise it is CREATED; and
- If the status of a container changes from CREATED or DELETED it updates STATUS with the time of that action.

Table 1 provides examples that show how the algorithm applies a compressed transaction log to identify the correct storage policy consistently. For purposes of the discussion herein, a compressed transaction log is a log stores only a current logical state, e.g. create+delete+create=create.

TABLE 1

TRANSACTION LOG APPLICATION

| STORAGE POLICY ALPHA | | | STORAGE POLICY OMEGA | | | CORRECT POLICY |
|---|---|---|---|---|---|---|
| PUT | DELETE | STATUS | PUT | DELETED | STATUS | |
| T1 | NIL | T1 | T2 | NIL | T2 | Alpha |
| T2 | NIL | T1 | T3 | NIL | T3 | Alpha |
| T1 | T2 | T2 | T3 | NIL | T3 | Omega |
| T2 | T1 | T2 | T3 | NIL | T3 | Alpha |
| T3 | T1 | T2 | T2 | NIL | T2 | Omega |
| T1 | NIL | T1 | T3 | T2 | T3 | Omega |
| T2 | T1 | T2 | T4 | T3 | T4 | Omega |
| T4 | NIL | T4 | T3 | T2 | T3 | Alpha |

The reconciler then moves the object from an incorrect policy to the correct policy for the container. Because storage nodes and container databases do not process writes with an X-timestamp less than or equal to their existing record, when objects writes are re-applied their timestamp is slightly incremented. A second vector of time has been added to Swift for internal use to allow this increment to be applied transparently to the client. In this example, the vector comprises two timestamps, reflecting 2-dimensional time, i.e.:

timestamp1_timestamp2, where timestamp1+N is always sorted after timestamp1_timestamp2+M, for any value M.

As the reconciler applies object writes to the correct storage policy it cleans up writes which no longer apply to the incorrect storage policy and removes the rows from the misplaced objects containers. Once all rows are successfully reconciled, the container reconciler deletes the now empty misplaced objects container. The reconciler continues to process the misplaced objects containers until they all have been reconciled and removed. After successfully processing all of the containers, the container reconciler sleeps.

Figure 5:
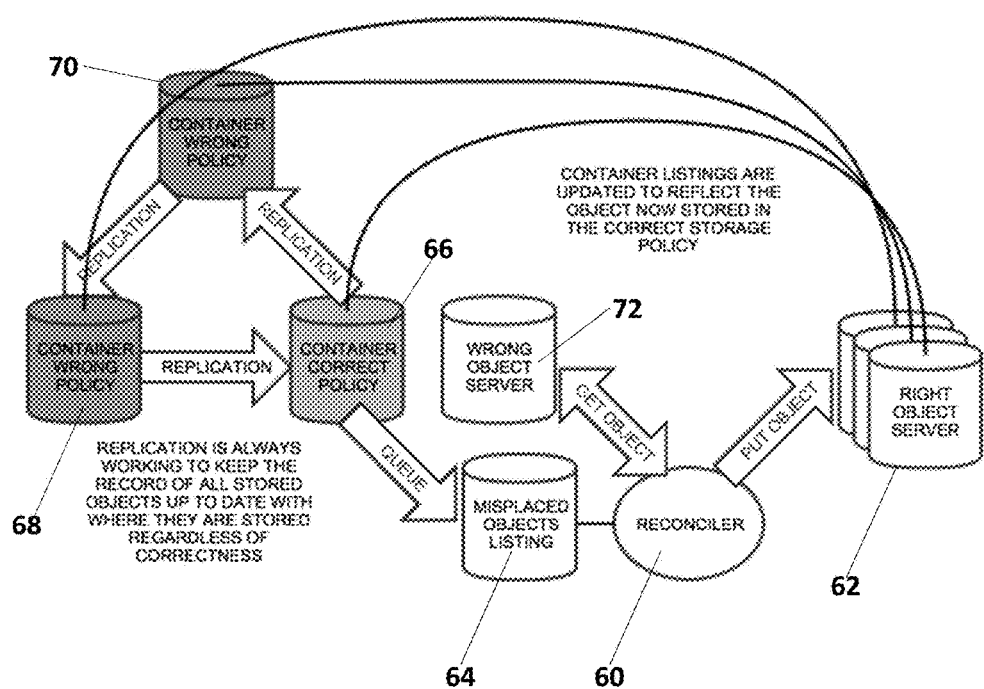
FIG. 5 is a block schematic diagram showing operation of a container reconciler according to the invention.

FIG. 5 is a block schematic diagram showing operation of a container reconciler. In FIG. 5, assume the scenario described earlier, where there are objects in one container that should conform to a policy of another container. The upper left part of FIG. 5 shows container replication amongst three containers 66, 68, 70. This is the process where updates that may have been missed by one container due to an outage of some kind are corrected by the other containers. One container 66 notices a conflict. The container recognizing the conflict enqueues information in a shared repository 64, such that a separate distributed service, i.e. the reconciler daemon 60, can take action on it asynchronously. The reconciler uses time/date sync points to determine conflict resolution. Conflict resolution rules can be adjusted for specific purposes. The reconciler moves objects to their correct policy, i.e. the right object server 62 and/or the wrong object server 72. Once the object has been repositioned for the correct policy, the container listings are updated by the right object server accordingly.

Example Three-Way-Split-Brain

The transaction history of a container's life-cycle is distributed and is replicated between all nodes by each node talking to each of its peers. During each conversation, only the local node and remote node's compressed transaction history is evaluated for an inconsistency. If an inconsistency is found, both nodes apply an update to ensure that subsequent negotiations prefer to accept the current agreement rather than renegotiate.

Consider the following pathological event sequence on three nodes (see Table 2). It is assumed that multiple messages were lost and the client evaluated the status of these requests as in error.

TABLE 2

THREE NODE EVENT SEQUENCE

| | POLICY ALPHA | POLICY BETA | POLICY OMEGA |
|---|---|---|---|
| T0 | PUT | | |
| T1 | DELETE | | |
| T2 | | DELETE | |
| T3 | | PUT | |
| T4 | | | DELETE |
| T5 | PUT | | |
| T6 | | | PUT |
| T7 | | AGREE Omega | AGREE Omega |
| T8 | AGREE Omega | | |

At T7, when the Beta and Omega nodes evaluate which policy was the policy first PUT following a DELETE they only evaluate requests in their timeline (T2, T3, T4, T6) and conclude that the PUT at T6 with the policy Omega was the first PUT following the DELETE at T4. Both update their records and enqueue any misplaced objects. At T8, when the Alpha node evaluates its log against either the Beta or Omega node, even though the PUT at T5 was actually the first PUT following the DELETE at T4, it accepts the status change at T7 as more significant than its change at T5 because it is preferable to reach consistency more quickly than delay potentially relocating data a second time.

Computer System

Figure 6:
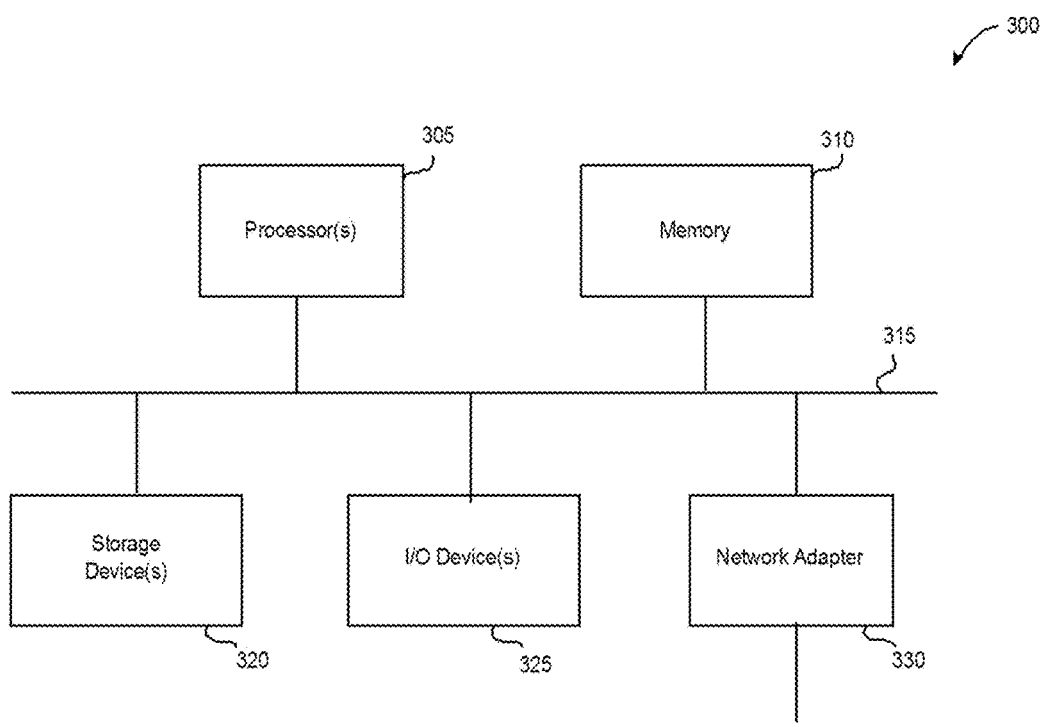
FIG. 6 shows a diagrammatic representation of a machine in the example form of a computer system within which a set of instructions for causing the machine to perform one or more of the methodologies discussed herein may be executed.

FIG. 6 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 300 may include one or more central processing units ("processors") 305, memory 310, input/output devices 325, e.g. keyboard and pointing devices, touch devices, display devices, storage devices 320, e.g. disk drives, and network adapters 330, e.g. network interfaces, that are connected to an interconnect 315. The interconnect 315 is illustrated as an abstraction that represents any one or more separate physical buses, point to point connections, or both connected by appropriate bridges, adapters, or controllers. The interconnect 315, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 310 and storage devices 320 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 310 can be implemented as software and/or firmware to program the processor 305 to carry out actions described above. In some embodiments, such software or firmware may be initially provided to the processing system 300 by downloading it from a remote system through the computing system 300, e.g. via network adapter 330.

The various embodiments introduced herein can be implemented by, for example, programmable circuitry, e.g. one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for discovering and logging misplaced objects in a distributed object storage system, comprising:

providing a processor running at least one container replicator in said distributed object storage system, said container replicator discovering storage policy inconsistencies;

said container replicator recording each transaction in a container database;

said container replicator adding said inconsistencies to a misplaced objects container;

said container replicator using a log format to record a history of state transitions which result from a series of requests, wherein said history is recorded in a plurality of container replicas;

each container replica maintaining a set of three vectors that indicate when the container replica last recorded a PUT or DELETE and when these actions resulted in a change of the container replica's status (created or deleted); and said container replicator comparing log items in said history between two or more containers to determine a representation of said state transaction history which resulted in a current state.

2. The method of claim 1, further comprising:

said container replicator identifying objects with conflicting storage policies; and when a conflicting object is identified, said container replicator copying said object's row from said container database to a local misplaced objects container.

3. The method of claim 1, further comprising:

said container replicator creating a misplaced objects container when a misplaced objects container does not already exist.

4. The method of claim 1, further comprising:

a container reconciler periodically locating and processing any misplaced objects containers;

said container reconciler examining object rows in each misplaced objects container in descending order and then determining a correct policy; and said container reconciler making calls to disputed containers and using timestamp information to determine which policy is the correct policy for the container.

5. The method of claim 4, further comprising:

when a container is created, said container reconciler updating PUT and STATUS with a time of that action;

when a container is deleted, said container reconciler updating DELETE with a time of that action;

when a time of a DELETE action is not nil and it is greater than a time of a PUT action, said container reconciler considering said container to be in a DELETED state, otherwise said container is CREATED; and when status of a container changes from CREATED or DELETED, said container reconciler updating STATUS with a time of said change.

6. The method of claim 4, further comprising:

said container reconciler moving an object from an incorrect policy to the correct policy for the container.

7. The method of claim 4, further comprising:

said container reconciler applying object writes to a correct storage policy;

said container reconciler cleaning up writes to an incorrect storage policy which no longer apply and removing rows from misplaced objects containers;

when all rows are successfully reconciled, said container reconciler deleting any now empty misplaced objects containers; and said reconciler continuing to process misplaced objects containers until all misplaced objects containers are reconciled and removed.

* * * * *